(12) United States Patent
Xiao

(10) Patent No.: US 7,886,326 B2
(45) Date of Patent: Feb. 8, 2011

(54) WEB CAM FOR INDICATING THE EXPRESSION OF A REMOTE END USER

(75) Inventor: Shi-Ying Xiao, Taipei County (TW)

(73) Assignee: KYE Systems Corp. (TW)

( * ) Notice: Subject to any disclaimer, the term of this patent is extended or adjusted under 35 U.S.C. 154(b) by 952 days.

(21) Appl. No.: 11/508,683

(22) Filed: Aug. 23, 2006

(65) Prior Publication Data

US 2008/0060033 A1    Mar. 6, 2008

(51) Int. Cl.
*H04N 7/173* (2006.01)

(52) U.S. Cl. .................... 725/105; 348/14.01

(58) Field of Classification Search ................. 382/124, 382/118, 108, 100, 101, 103, 190, 144
See application file for complete search history.

(56) References Cited

U.S. PATENT DOCUMENTS

2004/0130614 A1*  7/2004  Valliath et al. ........... 348/14.01
2005/0162511 A1*  7/2005  Jackson ........................ 348/61

* cited by examiner

*Primary Examiner*—Samir A. Ahmed
*Assistant Examiner*—Ruiping Li
(74) *Attorney, Agent, or Firm*—Raymond Sun

(57) ABSTRACT

A web cam system has a local end computer coupled to a local end web cam, and a remote end computer coupled to a remote end web cam, with the computers coupled to a network and communicating with each other via a messaging application. A facial expression of a local end user is captured at the local end web cam. A control signal that corresponds to the captured facial expression is generated at the local end computer, and then transferred via the network to the remote end computer, which generates an indication signal to an indicator at the remote end web cam. A response is output at the indicator that is indicative of the captured facial expression.

4 Claims, 6 Drawing Sheets

WEB CAM FOR INDICATING THE EXPRESSION OF A REMOTE END USER

BACKGROUND OF THE INVENTION

1. Field of the Invention

The present invention relates to a web cam, and in particular, to a web cam that shows changes in the facial expression of a remote end user.

2. Description of the Prior Art

In order to improve the add-on value of a web cam device, web cams have been designed to also function as an auto-tracking device such that a remote end user can always keep watch over the local end user. For example, Logitech's Quick-Cam® Orbit MP uses a similar technology, where such face-tracking or face-analyzing technologies have become quite familiar to those skilled in the art.

As another example, United States Pub. No. US2005/0044143 discloses a camera which captures still image, video, and/or audio data. Relevant information is then extracted from the captured data and analyzed. Known techniques such as face recognition, face tracking, and motion detection can be used for extracting and analyzing data. This information is then interpreted for instant messaging (IM) applications.

However, in the above-described applications, the information can only be used to update the status of the local end user or the remote end user (e.g., available, busy, on the phone, away from desk, etc.) on the IM application (software), but cannot show changes in the facial expressions of the remote end user directly from the local end web cam (i.e., the hardware) or the local end user directly from the remote end web cam (i.e., the hardware).

SUMMARY OF THE DISCLOSURE

It is an object of the present invention to provide a web cam that shows changes in the facial expressions of a remote user.

To accomplish the advantage mentioned above, the present invention provides a web cam system that has a local end computer coupled to a local end web cam, and a remote end computer coupled to a remote end web cam, with the computers coupled to a network and communicating with each other via a messaging application. A facial expression of a local end user is captured at the local end web cam. A control signal that corresponds to the captured facial expression is generated at the local end computer, and then transferred via the network to the remote end computer, which generates an indication signal to an indicator at the remote end web cam. A response is output at the indicator that is indicative of the captured facial expression.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
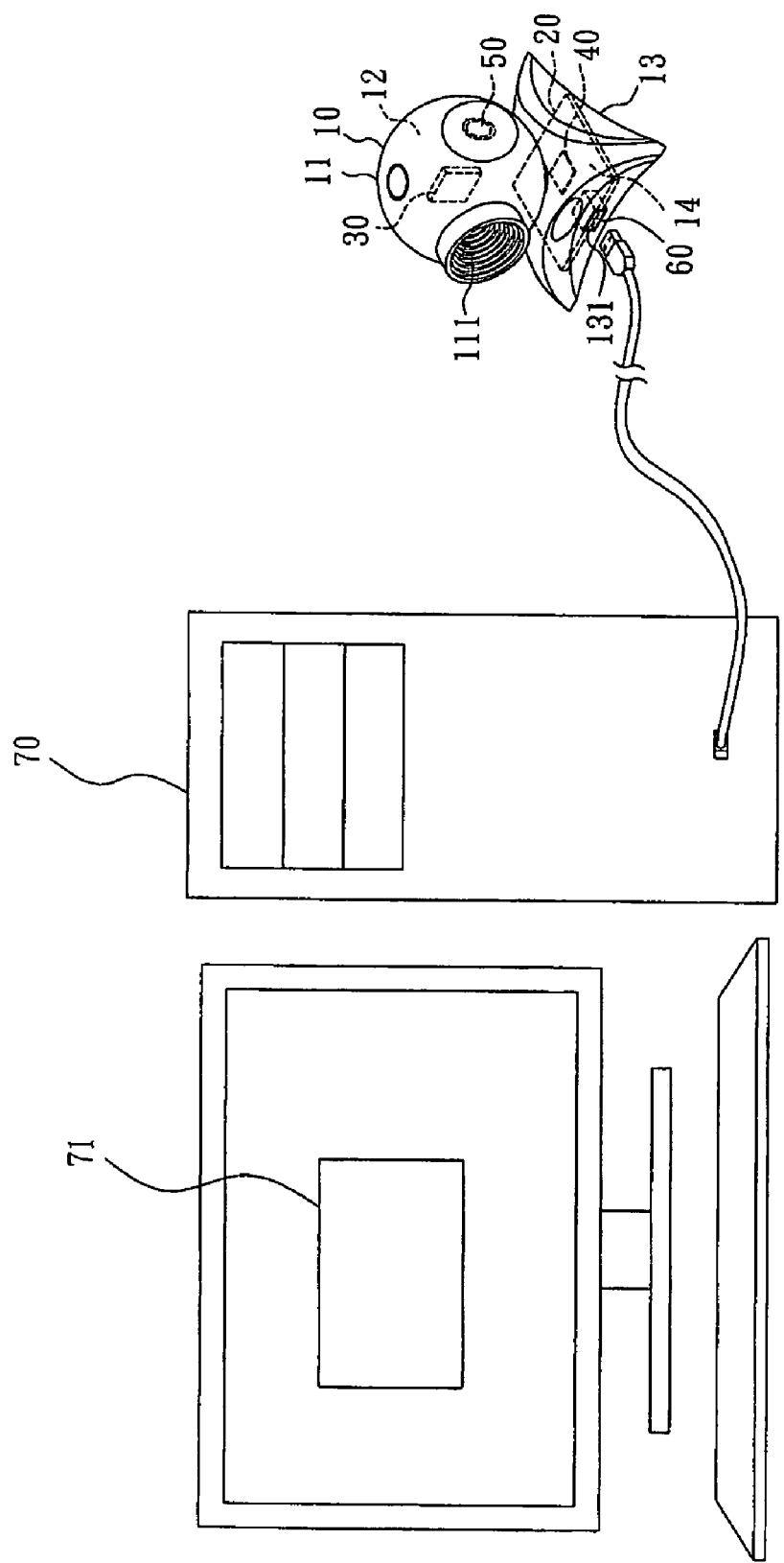
FIG. 1 is a perspective view of a web cam according to the present invention shown connected to a computer.
Figure 2:
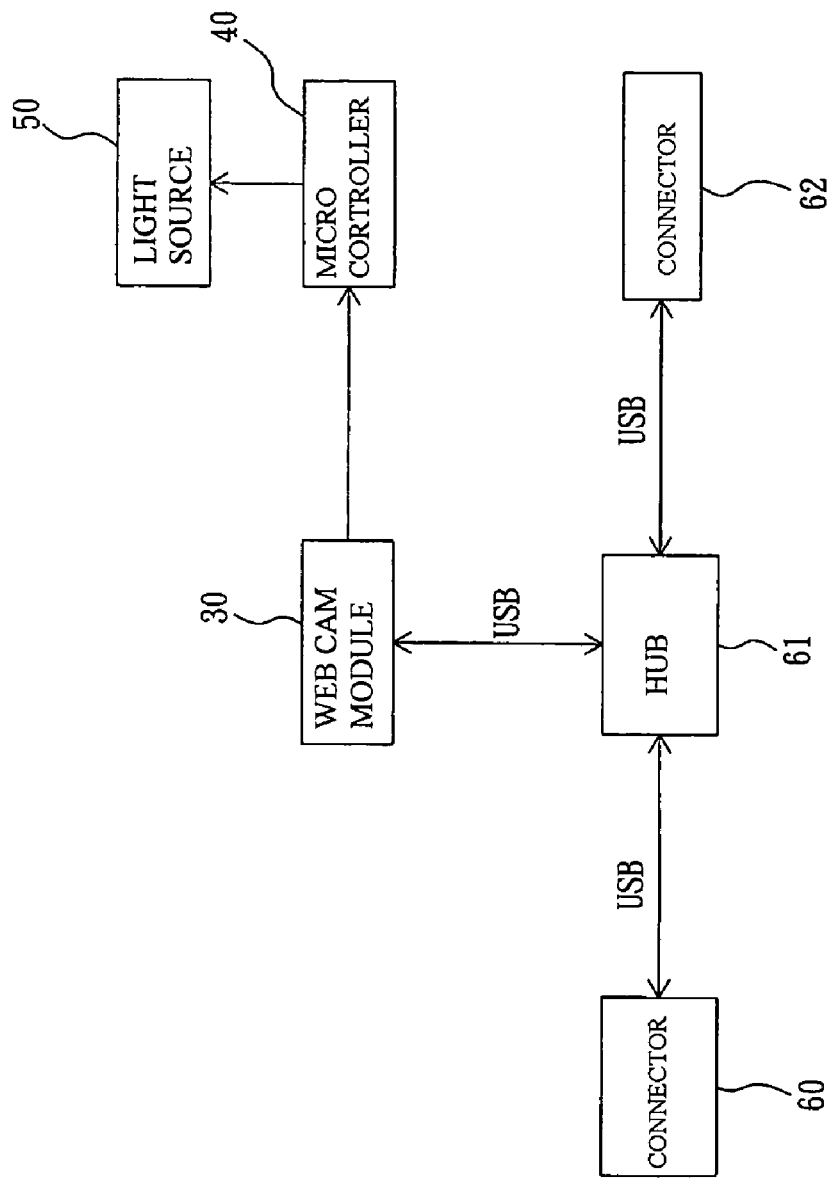
FIG. 2 is a block diagram of a web cam according to the present invention.

Referring to FIGS. 1-2, the web cam according to the present invention has a body 10, a circuit board 20 that is coupled to a web cam module 30, a micro controller 40 provided on the circuit board 20, at least one light source 50, and a connector 60 for coupling the web cam to a local end computer 70. The micro controller 40 is coupled to the web cam module 30 and to the light source 50. The web cam may further include a hub 61 for coupling to one or more other connectors 62. It is understood that a hub device can accommodate a plurality of connectors.

The light source 50 is controlled by the micro controller 40 such that the light source 50 can emit light in different colors, patterns, or other arrangements. In addition, the body 10 has an upper housing 11 and a lower housing 13. The upper housing 11 has a space 12 for accommodating the web cam module 30, a lens 111, and the light source 50. The computer 70 includes a program 71, such as a motion detection program or a face-tracking program, for analyzing the changes of the facial expressions of the web cam user that is being continually captured by the web cam module 30. The local computer 70 will generate a control signal based on the analysis of the program.

The program can be stored in a memory (e.g., a ROM or RAM) in the computer 70, and can be embodied in the form of any of the face-tracking programs that are commercially available in the marketplace. Commercial examples include the programs sold under the trademarks FACELOGON® and PCCAMSET® by Wavetronex of Taiwan. Other examples are illustrated in U.S. Pub. No. 2005/0044143 and U.S. Pub. No. 2005/0057656, whose disclosures are incorporated by this reference as though set forth fully herein. In addition, a motion detection program is disclosed in U.S. Pat. No. 6,813,372, whose disclosure is incorporated by this reference as though set forth fully herein.

Figure 3:
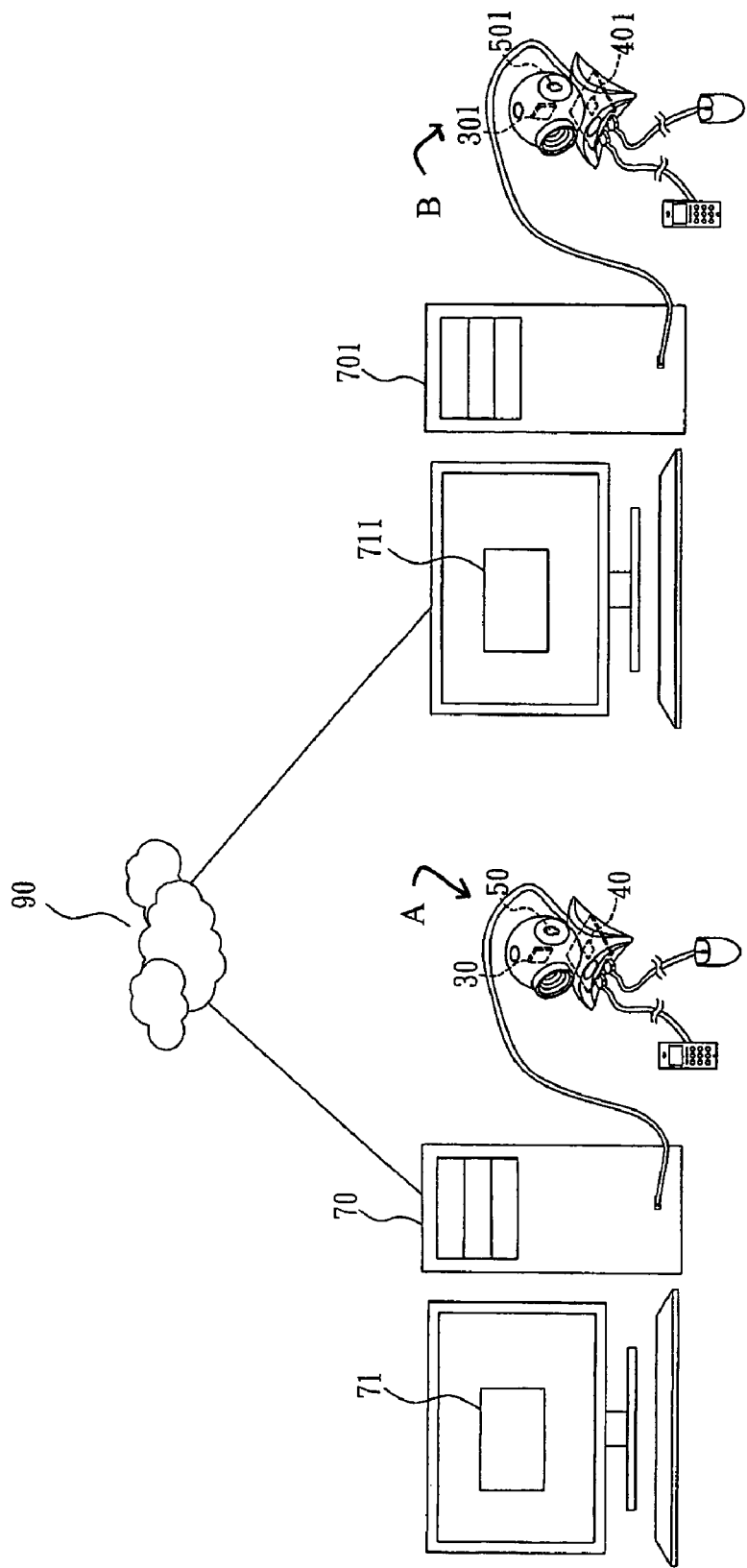
FIG. 3 is connection diagram showing a web cam system according to the present invention.

Referring to FIG. 3, the local end computer 70 is coupled to the local end web cam A, and the computer 70 is further connected to a network 90. Similarly, the remote end computer 701 is coupled to the remote end web cam B, and the computer 701 is also connected to the network 90. Both of the computers 70 and 701 can communicate using an IM application, such as Yahoo® messenger or MSN® messenger.

The local end web cam A continues capturing the facial expressions of the local end user, and the program 71 will analyze and determine the character of the local end user's face to see if he/she is smiling, crying, getting angry or making a wry face. For example, if the local end user is making a wry face, the program 71 will generate a wry-face signal to the computer 70. The computer 70 then generates a corresponding control signal which is further sent to the network 90 via the IM application, and the remote computer 701 will receive the control signal almost instantly. The remote computer 701 forwards the control signal to the micro controller 401 of the remote end web cam B, and the micro controller 401 will drive the light source 501 to emit a green light, for example.

Similarly, the remote end web cam B continues capturing the facial expressions of the remote end user, and the program 711 will analyze and determine the character of the remote end user's face to see if he/she is smiling, crying, getting angry or making a wry face. If the remote end user is getting angry, the program 711 will generate an angry signal to the computer 701. The computer 701 then generates a corresponding control signal which is further sent to the network 90 via the IM application, and the local computer 70 will receive the control signal almost instantly. The local computer 70 forwards the control signal to the micro controller 40 of the local end web cam A, and the micro controller 40 will drive the light source 50 to emit a red light, for example.

It will be appreciated by those skilled in the art that the connector 62 may be coupled to a mouse, or a Skype® phone, as shown in FIG. 3.

Figure 4:
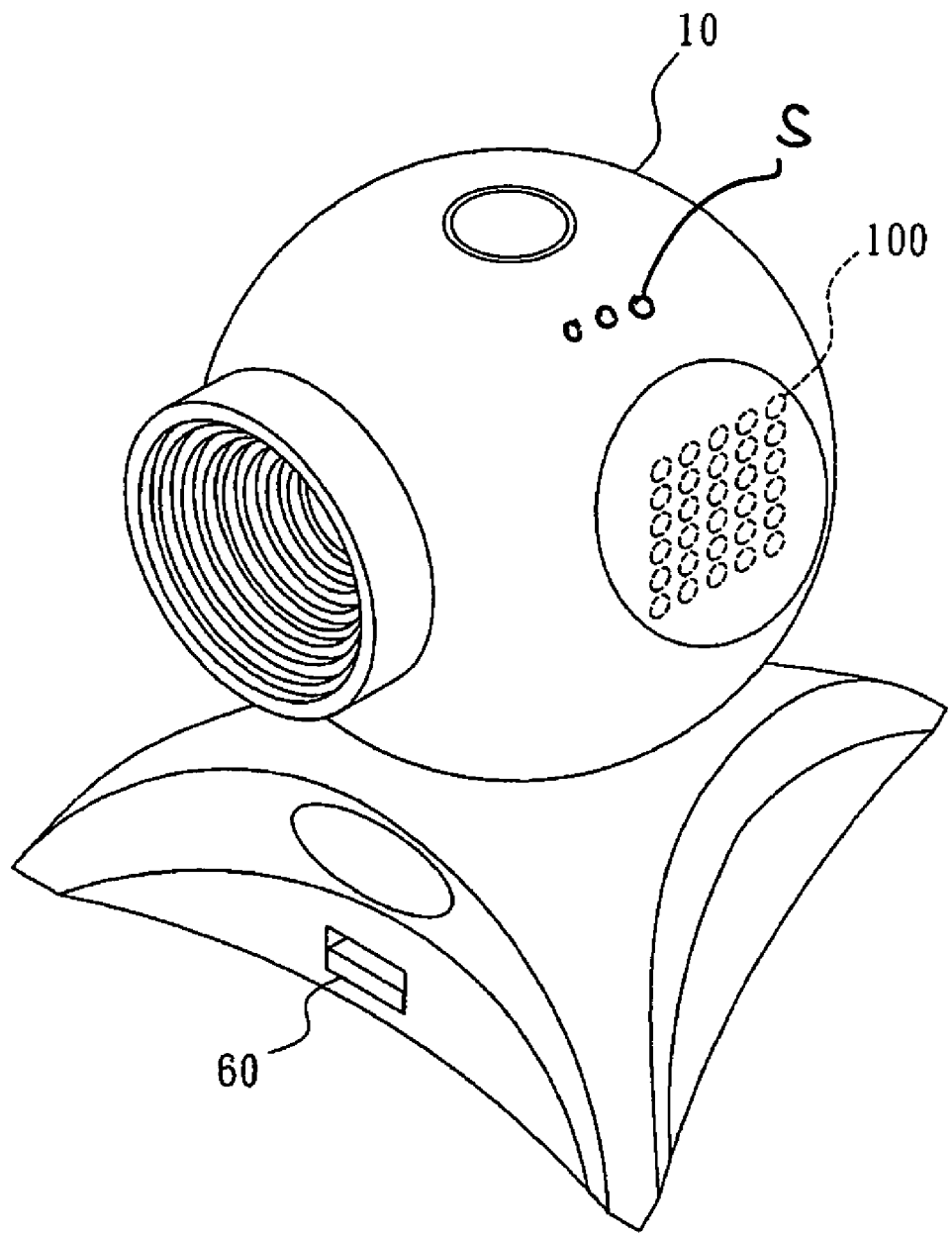
FIG. 4 is a perspective view of a web cam according to another embodiment of the present invention.
Figure 5:
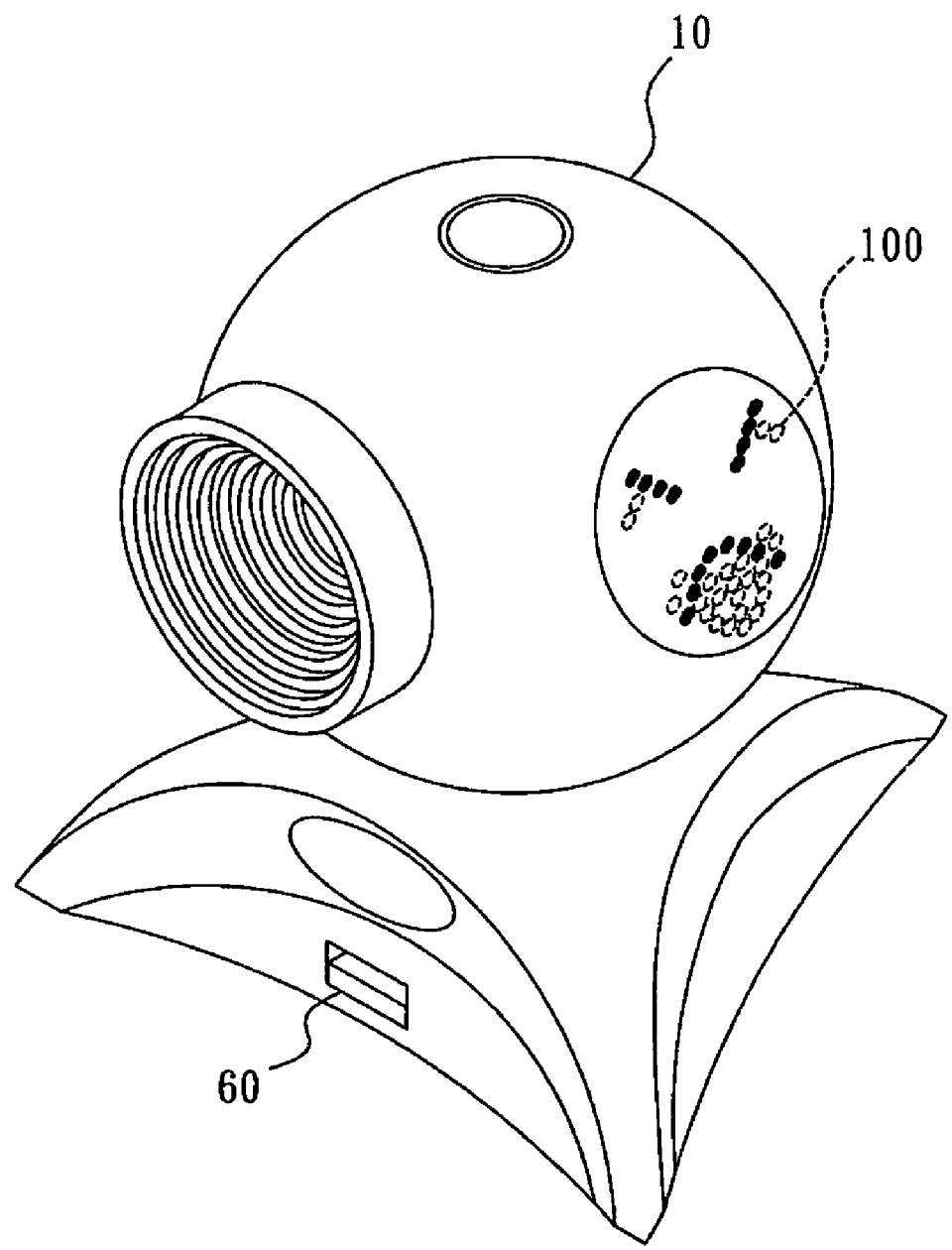
FIGS. 5 and 6 illustrate different faces that can be displayed by the light arrays of the web cam of FIG. 4.
Figure 6:
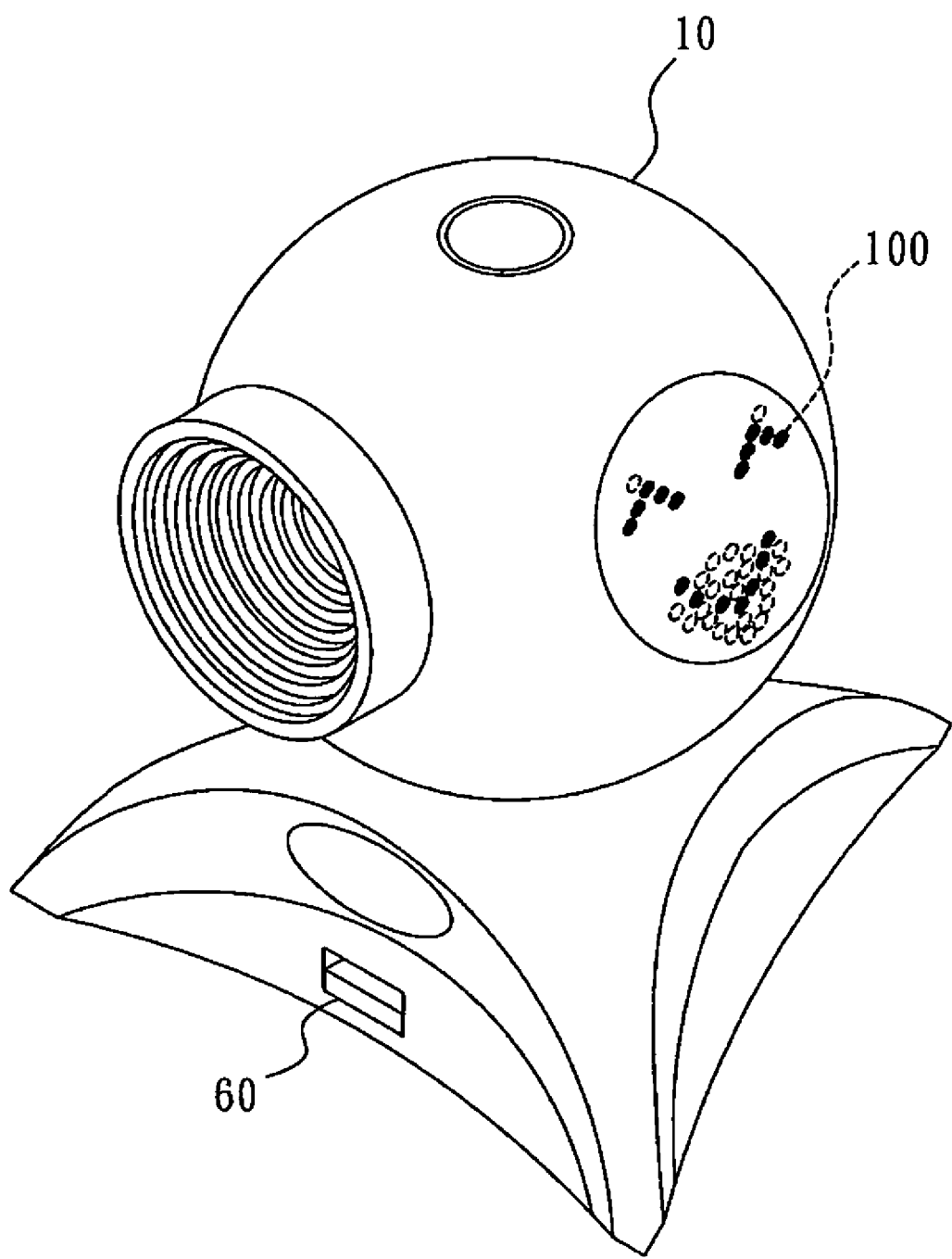

FIG. 4 illustrates another embodiment for the light source. The light source can be embodied in the form of a plurality of light arrays 100, which can be used to display different patterns that illustrate the facial expression. For example, if the remote end user is getting angry, the light arrays 100 of the local end web cam A will show an angry face, as illustrated in FIG. 5. Similarly, if the remote end user is smiling, the light arrays 100 of the local end web cam A will show a smiling face, as illustrated in FIG. 6.

In fact, the light generated by the light source 50 is an indication to the web cam user, and can be replaced by different indicators, such as sounds and movements. For example, a cheerful sound can be output from a speaker S (see FIG. 4) provided in the web cam A if the remote end user has a happy face, or a dramatic sound can be output from the speaker S provided in the web cam A if the remote end user has an angry face. As a further alternative, if the web cam is configured as a doll or an animal, the indication can be represented by various movements, such as a shaking hand, a nodding head, a wagging tail, etc.

By the system and structure described above, the present invention allows the local end user to observe the changing facial expressions of the remote end user not only from the monitor (software program), but also from the web cam (hardware device).

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A web cam system comprising:
a local end web cam that captures a facial expression of a local end user;
a local end computer coupled to the local end web cam, the local end computer including a face tracking program that generates a control signal that corresponds to the captured facial expression;
a remote end web cam having a housing that includes an indicator that comprises a single light source which emits a different colored light depending upon the captured facial expression;
a remote end computer coupled to the remote end web cam, the remote end computer including a face tracking program that receives the control signal and generates an indication signal to the indicator of the remote end web cam, with the at least one light source of the indicator outputting a colored light that is indicative of the captured facial expression; and
wherein the computers are coupled to a network and communicate with each other via a messaging application.

2. The system of claim 1, wherein:
the local end web cam has a housing that includes an indicator that comprises at least one light source, and the control signal is a local control signal;
the remote end web cam captures a facial expression of a remote end user, and the remote end computer includes a face tracking program that generates a remote control signal that corresponds to the captured facial expression from the remote end user; and
the tracking program of the local end computer receives the remote control signal and generates an indication signal to the indicator of the local end web cam, with the light source of the indicator of the local end web cam outputting a colored light that is indicative of the captured facial expression from the remote end user.

3. A web cam system comprising:
a local end web cam that captures a facial expression of a local end user;
a local end computer coupled to the local end web cam, the local end computer including a face tracking program that generates a control signal that corresponds to the captured facial expression;
a remote end web cam having a housing that includes an object, the object having a plurality of moving parts;
a remote end computer coupled to the remote end web cam, the remote end computer including a face tracking program that receives the control signal and generates an indication signal to the object of the remote end web cam, with selected ones of the moving parts being actuated based on the captured facial expression; and
wherein the computers are coupled to a network and communicate with each other via a messaging application.

4. The system of claim 3, wherein:
the local end web cam has a housing that includes an object that has a plurality of moving parts, and the control signal is a local control signal;
the remote end web cam captures a facial expression of a remote end user, and the remote end computer includes a face tracking program that generates a remote control signal that corresponds to the captured facial expression from the remote end user; and
the tracking program of the local end computer receives the remote control signal and generates an indication signal to the object of the local end web cam, with selected ones of the moving parts of the object at the local end web cam being actuated based on the captured facial expression from the remote end user.

* * * * *